(12) United States Patent
Lulic et al.

(10) Patent No.: US 10,878,416 B2
(45) Date of Patent: Dec. 29, 2020

(54) APPARATUS, METHOD, AND COMPUTER PROGRAM PRODUCT FOR BUS RAPID TRANSIT TICKETING AND THE LIKE

(71) Applicant: MasterCard International Incorporated, Purchase, NY (US)

(72) Inventors: Mark Lulic, Mohegan Lake, NY (US); Alexander Antunovic, Astoria, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1871 days.

(21) Appl. No.: 14/310,061

(22) Filed: Jun. 20, 2014

(65) Prior Publication Data

US 2014/0379391 A1    Dec. 25, 2014

Related U.S. Application Data

(60) Provisional application No. 61/838,081, filed on Jun. 21, 2013.

(51) Int. Cl.
| | |
|---|---|
| *G07B 15/02* | (2011.01) |
| *G06Q 20/40* | (2012.01) |
| *G06Q 20/32* | (2012.01) |
| *G06Q 20/04* | (2012.01) |
| *G06Q 20/08* | (2012.01) |
| *G06Q 20/14* | (2012.01) |

(52) U.S. Cl.
CPC ......... *G06Q 20/40* (2013.01); *G06Q 20/0457* (2013.01); *G06Q 20/0855* (2013.01); *G06Q 20/145* (2013.01); *G06Q 20/322* (2013.01); *G06Q 20/3224* (2013.01); *G07B 15/02* (2013.01)

(58) Field of Classification Search
CPC .............. G06Q 20/40; G06Q 2240/00; G07B 15/00–15/04
See application file for complete search history.

(56) References Cited

U.S. PATENT DOCUMENTS

| | | | | |
|---|---|---|---|---|
| 4,298,793 A | * | 11/1981 | Melis .................... | G06F 3/0231 235/487 |
| 5,991,749 A | * | 11/1999 | Morrill, Jr. ............ | G06Q 20/04 705/13 |
| 6,636,833 B1 | | 10/2003 | Flitcroft et al. | |

(Continued)

OTHER PUBLICATIONS

Watermark—Britannica Online Encyclopedia, Jan. 2015.*
Tirkel, et al., Electronic Water Mark, Conference: Digital Image Computing, Technology and Applications, At Sydney, Australia, Dec. 1993, pp. 666-673.*
Digital Watermarking, WatermarkingWorld.com, WebArchive copy dated Dec. 2, 2007.*

(Continued)

*Primary Examiner* — Daniel Vetter
(74) *Attorney, Agent, or Firm* — Otterstedt, Wallace & Kammer, LLP

(57) ABSTRACT

At a remote server, an indication is obtained that a prospective transit rider has come into geographic proximity of a particular transit boarding area. At the remote server, an authorization request is dispatched to an issuer of a payment card account associated with the prospective transit rider, based on the remote server accessing a database based on the indication. At the remote server, a response to the authorization request is obtained from the issuer. If the response is affirmative, dispatch of an electronic ticket to a portable electronic device of the prospective transit rider is initiated.

7 Claims, 6 Drawing Sheets

(56) References Cited

U.S. PATENT DOCUMENTS

| | | | |
|---|---|---|---|
| 6,741,523 B1* | 5/2004 | Bommarito | G04F 1/00 368/89 |
| 7,136,835 B1 | 11/2006 | Flitcroft et al. | |
| 2004/0099732 A1* | 5/2004 | Andrews | G06Q 20/363 235/380 |
| 2011/0153495 A1* | 6/2011 | Dixon | G06Q 20/10 705/39 |
| 2012/0130889 A1 | 5/2012 | Lyons et al. | |
| 2012/0131094 A1 | 5/2012 | Lyons et al. | |
| 2013/0173357 A1* | 7/2013 | Lishak | G06Q 10/00 705/13 |
| 2013/0179336 A1 | 7/2013 | Lyons | |
| 2014/0067488 A1* | 3/2014 | James | G06Q 30/02 705/13 |

OTHER PUBLICATIONS

QkR by MasterCard Debuts in Australia | MasterCard Social Media Newsroom, pp. 1-2, Downloaded From http://newsroom.mastercard.com/videos/qkr-by-mastercard-debuts-in-australia/ on Jun. 20, 2013.

Australia to see yet another world first in Mobile Payments, pp. 1-3, Downloaded From https://newsroom.mastercard.com/press-releases/9737/ on Mar. 21, 2018, Original Dated Jan. 24, 2012.

MasterCard and Commonwealth Bank provide spectators with new reasons to cheer at Etihad Stadium, pp. 1-3, Downloaded From https://newsroom.mastercard.com/press-releases/mastercard-and-commonwealth-bank-provide-spectators-with-new-reasons-to-cheer-at-etihad-stadium/ on Mar. 21, 2018, Original Dated Oct. 18, 2012.

\* cited by examiner

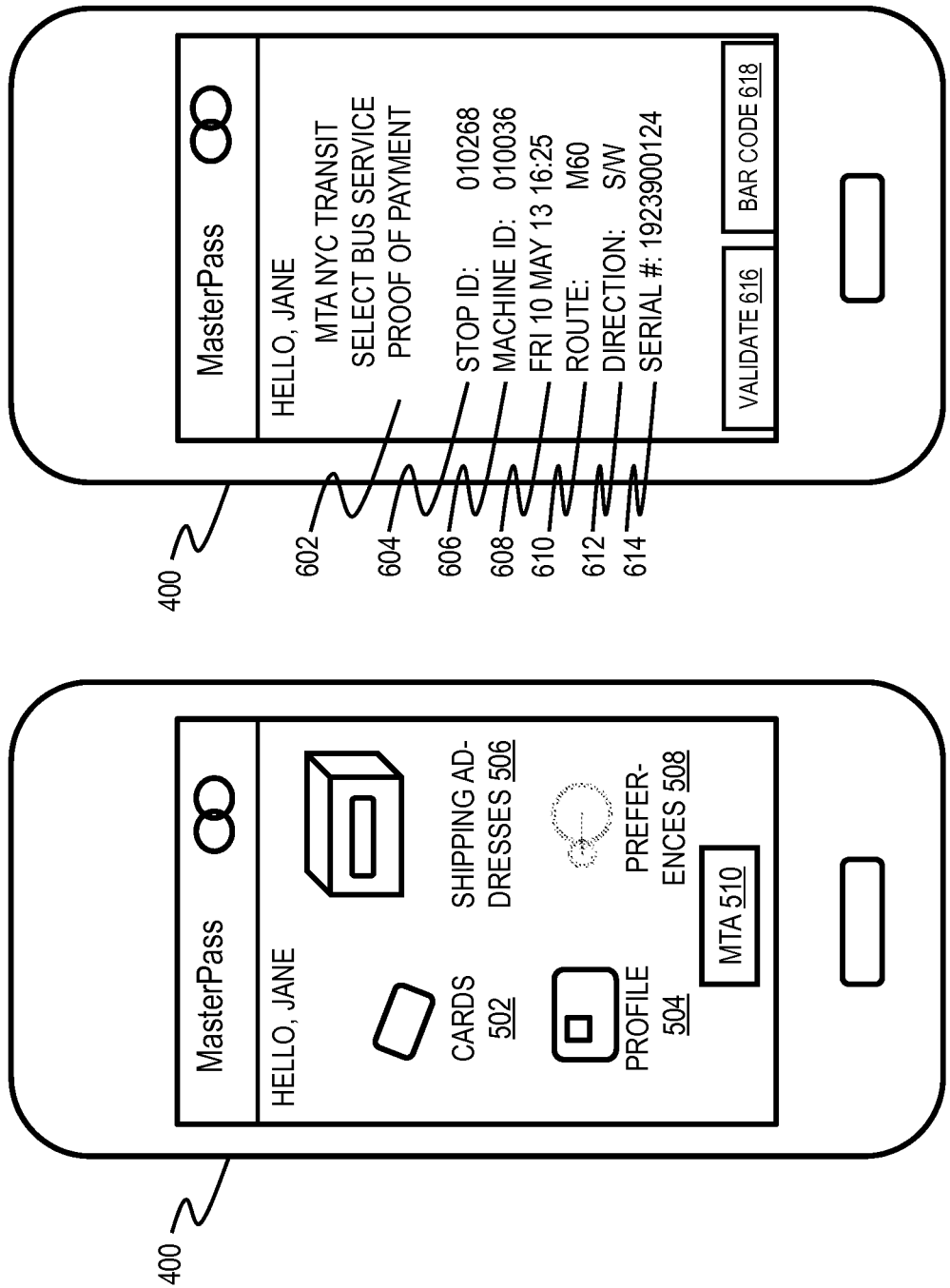

APPARATUS, METHOD, AND COMPUTER PROGRAM PRODUCT FOR BUS RAPID TRANSIT TICKETING AND THE LIKE

CROSS-REFERENCE TO RELATED APPLICATIONS

This patent application claims the benefit of U.S. Provisional Patent Application Ser. No. 61/838,081 filed on 21 Jun. 2013 and entitled "APPARATUS, METHOD, AND COMPUTER PROGRAM PRODUCT FOR BUS RAPID TRANSIT TICKETING AND THE LIKE." The complete disclosure of the aforementioned U.S. Provisional Patent Application Ser. No. 61/838,081 including all appendices thereof is expressly incorporated herein by reference in its entirety for all purposes.

FIELD OF THE INVENTION

The present invention relates generally to the electronic and computer arts and, more particularly, to payment and/or access control using wireless devices and the like.

BACKGROUND OF THE INVENTION

Ticketing and payment for bus rapid transit or BRT (express or limited stop bus routes) is currently hardware-based, Typically, a consumer places a dedicated transit card or media product into a reader which returns a paper receipt that can be used for a ride on the express bus,

SUMMARY OF THE INVENTION

Principles of the invention provide an apparatus, method, and/or computer program product for bus rapid transit ticketing and the like.

In one aspect, an exemplary method includes the steps of obtaining, at a remote server, an indication that a prospective transit rider has come into geographic proximity of a particular transit boarding area; at the remote server, dispatching an authorization request to an issuer of a payment card account associated with the prospective transit rider, based on the remote server accessing a database based on the indication; obtaining, at the remote server, a response to the authorization request, from the issuer; and, if the response is affirmative, initiating dispatch of an electronic ticket to a portable electronic device of the prospective transit rider.

In another aspect, another exemplary method includes the steps of dispatching, from a portable electronic device of a prospective transit rider, to a remote server, an indication that the prospective transit rider has come into geographic proximity of a particular transit boarding area; obtaining, from the remote server, a confirmation query seeking to confirm whether the prospective transit rider seeks to board a certain transit mode, at a certain fare, the confirmation query having been determined based on the indication; dispatching, from the portable electronic device of the prospective transit rider, to the remote server, an affirmative response to the confirmation query; and obtaining, from the remote server, an electronic ticket.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, including:

- The solution does not require the merchant to deploy physical hardware (i.e. point of sale (POS) device, card reader, personal identification number (PIN) pad, or display LCD (liquid crystal display))
- If data location services (i.e. GPS) are disabled, fallback methods afford the consumer a similar experience (i.e. QR or other bar code or Serial Number) posted at the point of entry
- The solution uses a merchant-direct processing platform (hosted, for example, by an operator of a payment processing network such as MasterCard International Incorporated of Purchase, N.Y., USA), to minimize overall authorization times to under one second
- Transaction logs and/or reports are submitted to the merchant's acquirer for clearing and/or settlement, similar to existing infrastructures in place today These and other features and advantages of the present invention will become apparent from the following detailed description of illustrative embodiments thereof, which is to be read in connection with the accompanying drawings.

BRIEF DESCRIPTION OF THE DRAWINGS

FIGS. 5 and 6 are simulated screen shots of the "smart" phone of FIG. 4 in accordance with aspects of the invention;

DETAILED DESCRIPTION OF PREFERRED EMBODIMENTS

Figure 1:
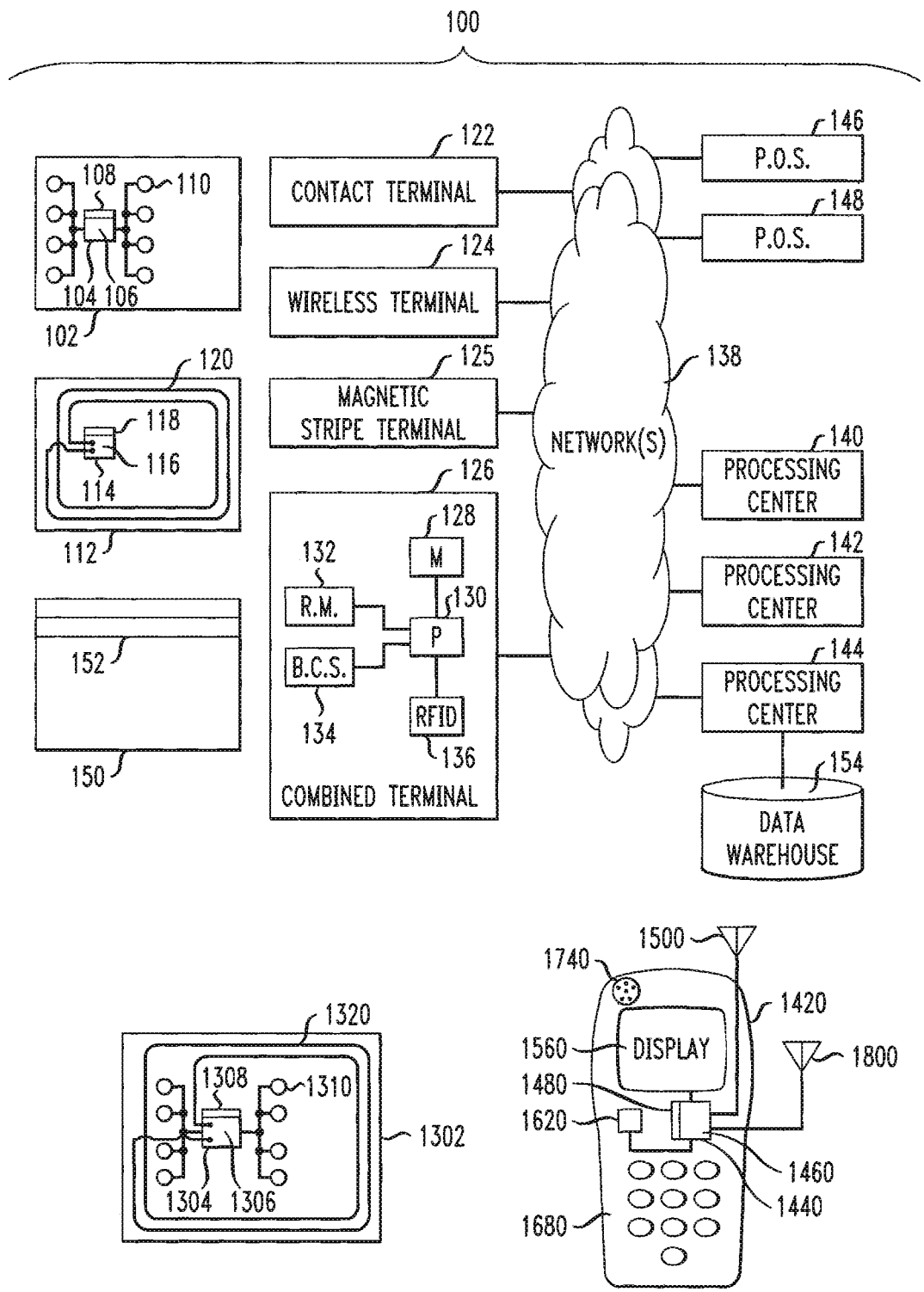
FIG. 1 shows an example of a system and various components thereof that can implement at least portions of at least some techniques of the invention.

Attention should now be given to FIG. 1, which depicts an exemplary embodiment of a system 100 and various components thereof that can implement at least portions of at least some techniques of the invention. In this regard, one or more embodiments of the invention are generally applicable to cellular telephones, Internet tablets, and other mobile electronic devices, optionally with satellite navigation system (global positioning satellite or GPS) capability, optionally with "Wi-Fi" capability, and the like. As used herein, "Wi-Fi" is defined to include any "wireless local area network (WLAN) products that are based on the Institute of Electrical and Electronics Engineers' (IEEE) 802.11 standards," regardless of whether entitled to utilize the "Wi-Fi" trademark or the "Wi-Fi CERTIFIED" logo.

System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), tablet, and the like can be used to carry out contactless payments and/or ticketing in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate approach, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, tablets, or indeed any device with the capabilities to implement techniques of the invention. In some cases, the cards, or other payment devices, can include body portions (e.g., laminated plastic layers of a payment card, case or cabinet of a tablet, PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 1420. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In an optional aspect, the aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

A dual-interface device 1302 is sometimes employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 or similar device (e.g., tablet) can also be employed in a number of embodiments. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for a payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided. Many current devices omit keypad 1680 and employ a touchscreen instead. See discussion of FIG. 4 below.

The description of devices, elements, or components 102, 104, 106, 108, 110, 112, 114, 116, 118, 120 throughout this document are equally applicable to the corresponding items in the dual interface card 1302 and cellular telephone handset 1420.

Figure 2:
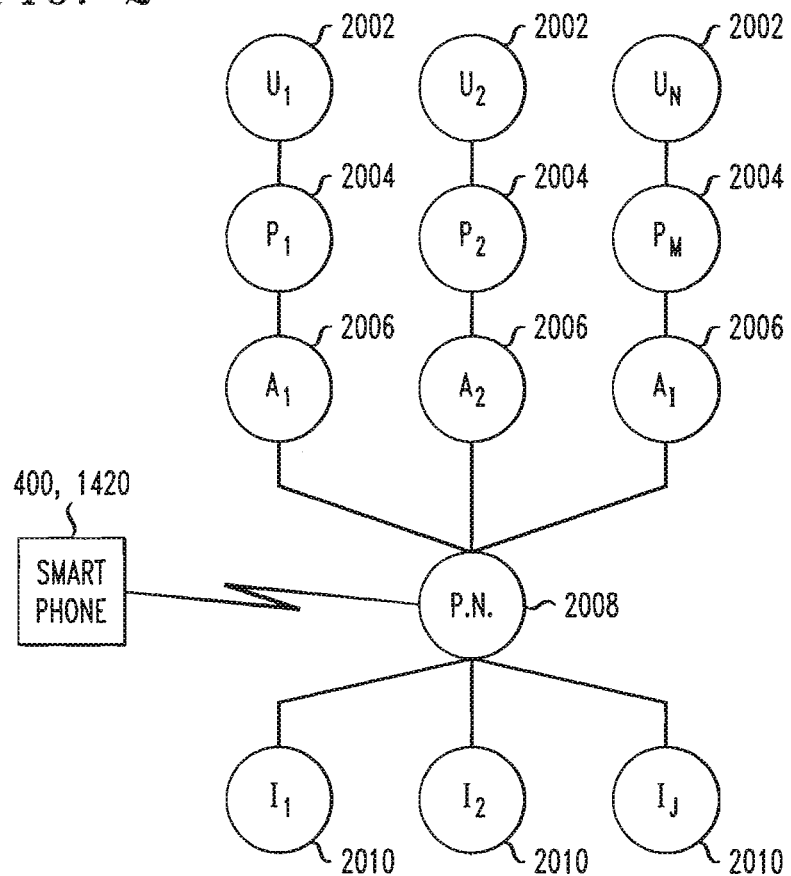
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the aforementioned BANKNET® network, or Visa International Service Association, operator of the aforementioned VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. In other instances, a payment network configured to facilitate transactions between multiple issuers and a single acquirer could be used. Some embodiments of the invention may be employed with other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity. In some instances, the authorization response can be sent directly to a financial entity outside of an ISO 8583 authorization message.

Messages within a network such as network 138 and/or network 2008, may, in at least some instances, conform to the ISO Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN) (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network.

As seen in FIG. 2, in some instances, the owner or user of a smart phone 400, 1420 or similar device configured in accordance with one or more embodiments of the invention accesses a web site or the like (e.g., of the payment network operator 2008 or a transit system operator) to download a suitable application 421, discussed below, to the smart phone 400, 1420 or similar device. This feature is optional. Note that the connection between phone 1420 and payment network operator 2008 may very well be indirect; for example, payment network operator 2008 or a transit system operator may provide a "golden copy" of the application 421 to a third party (e.g., APPLE 'APP' STORE or 'Google Play'—Apple Inc. Cupertino, Calif., USA and Google Inc., Mountain View, Calif., USA) and phone 400, 1420 downloads over the web from such third party. The link shown between phone 400, 1420 and payment network operator 2008 may be direct or indirect; for example, via a cellular network and possibly with one or more intermediate parties.

Figure 4:
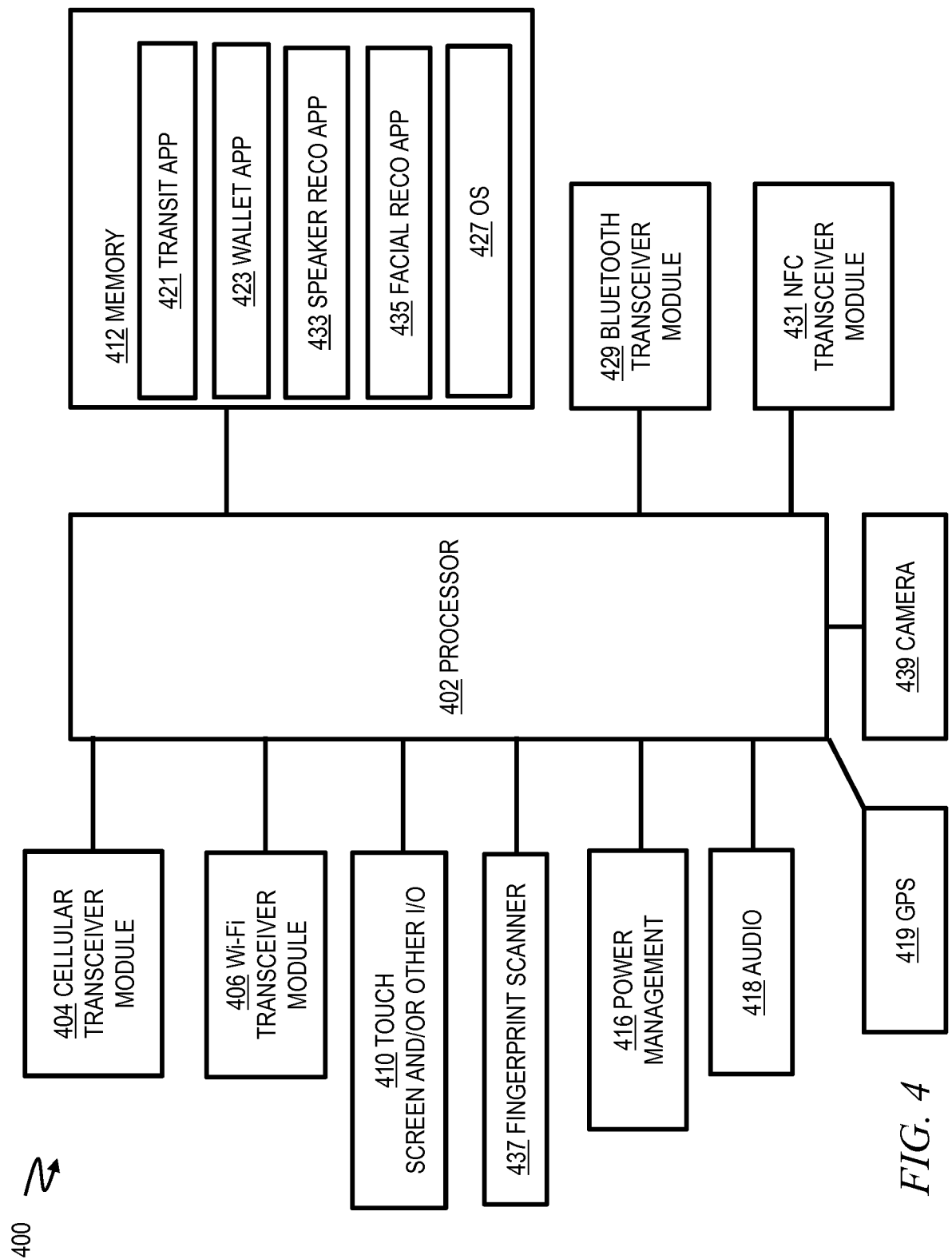
FIG. 4 is a block diagram of a "smart" phone or tablet computer configured in accordance with another aspect of the invention.

FIG. 4 is a block diagram of an exemplary tablet computing device or smart phone 400 or the like. Unit 400 includes a suitable processor; e.g., a microprocessor 402. A cellular transceiver module 404 coupled to processor 402 includes an antenna and appropriate circuitry to send and receive cellular telephone signals, e.g., 3G or 4G. A Wi-Fi transceiver module 406 coupled to processor 402 includes an antenna and appropriate circuitry to allow unit 400 to connect to the Internet via a wireless network access point or hotspot. The skilled artisan will appreciate that "Wi-Fi" is a trademark of the Wi-Fi Alliance and the brand name for products using the IEEE 802.11 family of standards. A Bluetooth transceiver module 429 coupled to processor 402 includes an antenna and appropriate circuitry to allow unit 400 to connect to other devices via the Bluetooth wireless technology standard. An NFC transceiver module 431 coupled to processor 402 includes an antenna and appropriate circuitry to allow unit 400 to establish radio communication via near-field communications.

One or more embodiments include a transit application 421 in memory 412 which when executed causes the processor 402 to implement at least a portion of the functionality described herein. Operating system 427 orchestrates the operation of unit 400. Apple's iOS and Google's Android are non-limiting examples of suitable operating systems.

Touch screen 410 coupled to processor 402 is also generally indicative of a variety of input/output (I/O) devices such as a keypad, another type of display, a mouse or other pointing device, and so on, all of which may or may not be present in one or more embodiments. Audio module 418 coupled to processor 402 includes, for example, an audio coder/decoder (codec), speaker, headphone jack, microphone, and so on. Power management system 416 can include a battery charger, an interface to a battery, and so on. Memory 412 is coupled to processor 402. Memory 412 can include, for example, volatile memory such as RAM, and non-volatile memory such as ROM, flash, or any tangible computer-readable recordable storage medium which stores information in a non-transitory manner. Processor 402 will typically also have on-chip memory.

Fingerprint scanner 437 is coupled to processor 402 for biometric authentication purposes. An appropriate corresponding software application (not separately depicted) may reside in memory 412 in some instances. Many cell phones are equipped with a digital camera 439, shown coupled to processor 402. In some embodiments, camera 439 is used in conjunction with a facial recognition application 435 in memory 412 for biometric verification. In some embodiments, a microphone in audio module 418 is used in conjunction with a speaker recognition application 433 in memory 412 for biometric verification; a suitable acoustic front end can be provided. Some embodiments include a wallet application 423 as discussed elsewhere herein.

One or more embodiments include a GPS unit 419 which provides the location of phone or tablet 400 via communication with global positioning system (GPS) satellites.

Memory 412 can also include, for example, a stored PIN for comparison with a PIN entered via touch screen 410; extracted facial features from the legitimate owner of the phone for comparison with facial features extracted from a picture taken by camera 439; extracted fingerprint features from the legitimate owner of the phone for comparison with fingerprint features obtained from a scan carried out by scanner 437; and/or extracted voice features from the legitimate owner of the phone for comparison with voice features extracted from a voice sample obtained from a microphone in audio module 418. Note that elements in FIG. 4 are shown connected directly to processor 402; however, one or more bus structures can be employed in one or more embodiments. Furthermore, elements shown as implemented in software may be implemented at least in part in hardware for speed, if desired.

Note every embodiment will have every feature in FIG. 4. Purely by way of example, some embodiments omit the biometric authentication features shown in FIG. 4. Other embodiments may omit one or more of modules 406, 429, and/or 431.

One or more embodiments are useful, by way of example and not limitation, in the context of bus rapid transit or BRT (express or limited stop bus route). Currently, BRT is a hardware-based environment where a consumer places his or her dedicated transit fare card or media product into a reader and the same prints out a receipt that can be used for the express service bus. In at least some, cases, the receipt is not checked by the bus driver when the passenger boards the bus; indeed, in some instances, passengers may enter through an alternate door or doors. Accordingly, in at least some current BRT systems, an honor system is employed; however, a passenger who is later discovered not to have his or her receipt may be fined.

One or more embodiments provide a mobile solution for BRT, using, e.g., a smart phone or the like.

Currently, these are bus stops (which may or may not have shelters) and there is an electronic kiosk where passengers obtain their tickets. In one or more known systems, the rider pays exact change by coin or may insert his or her dedicated transit fare card into a reader to obtain his or her ticket. Current solutions are expensive as a hardware implementation is required plus high-speed fiber optic cable communications back to the transit merchant's data center are required. Furthermore, the kiosks are subject to vandalism and/or need to be replaced when they reach the end of their life cycles or warranties.

One or more embodiments advantageously do not require additional hardware but rather employ GPS coordinates or visible indicia posted near the bus stop. One or more embodiments allow purchase of the ticket via a mobile phone or the like. In one or more embodiments, the customer is in the vicinity of a bus stop, pays with a payment card account (e.g., a MasterCard card account), and obtains a receipt similar to that used today. One or more embodiments use GPS coordinates to identify the putative rider's location. In at least some instances, if he or she is not in the correct location, he or she is not permitted to pay, because of specific fares for specific bus routes. Currently, each bus stop is specific to each service. This allows accurate use of GPS coordinates in one or more embodiments. In one or more embodiments, if the potential passenger is at certain coordinates, he or she can only buy a ticket for a certain route in a certain direction.

Furthermore in this regard, express bus routes may have limited stops, all part of the same route. In some embodiments, every bus stop of interest has geographical coordinates that can identify it. The coordinates are specific to a few square meters. Various back-up approaches are available where there are issues with GPS reception (e.g., the so-called "canyon effect" in locations with many skyscrapers, wherein tall buildings cause some reception challenges where one GPS satellite may or may not be read). One suitable back-up approach involves indicia such as a serial number posted on the bus stop. For example, a passenger goes to a bus stop and wants to pay but is unable to obtain an accurate GPS location with his or her phone. A suitable transit app 421 prompts the passenger consumer to enter the serial number (or other indicia) associated with the bus stop.

Figure 7:
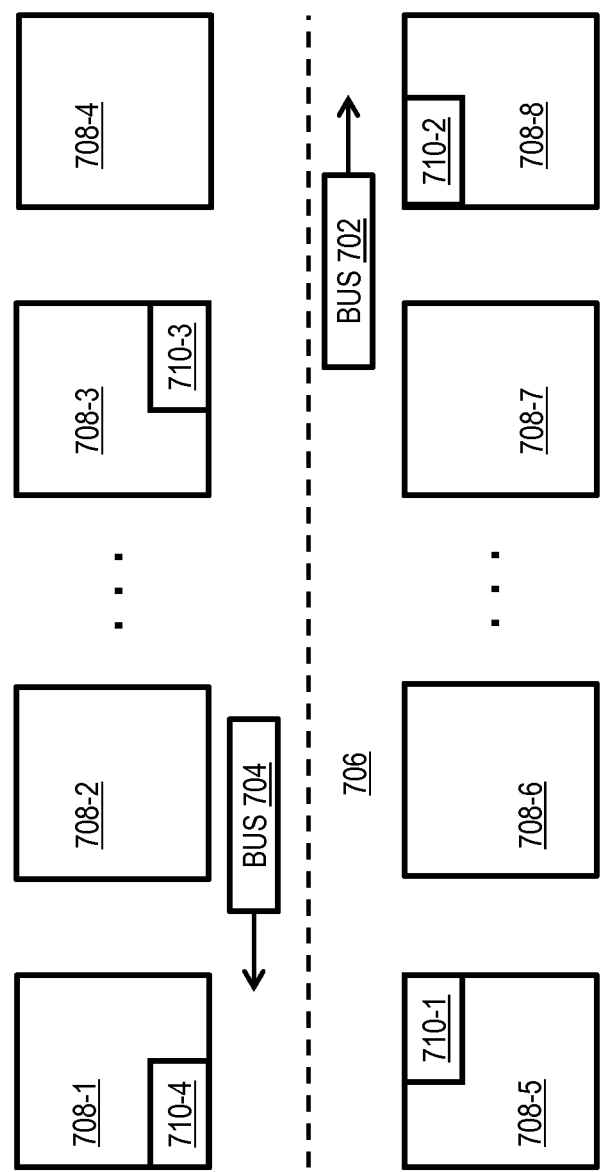
FIG. 7 is a simplified diagram of an exemplary express bus route in accordance with an aspect of the invention.

Attention should now be given to FIG. 7. A road 706 has an express bus route thereon. Assume for illustrative convenience that the elements depicted in FIG. 7 are oriented in a conventional map fashion, i.e., bus 702 is travelling right or east, bus 704 is traveling left or west, city blocks 708-1, 708-2, 708-3, and 708-4 are on the north side of road 706, and city blocks 708-5, 708-6, 708-7, and 708-8 are on the south side of road 706. The city blocks may include buildings and sidewalks, omitted from FIG. 7 for clarity. There are cross streets running north-south, not separately numbered to avoid clutter. Some of the blocks 708 include express bus stops 710; e.g., block 708-1 has bus stop 710-4 in the southwest corner thereof; block 708-3 has bus stop 710-3 in the southeast corner thereof; block 708-5 has bus stop 710-1 in the northeast corner thereof, and block 708-8 has bus stop 710-2 in the northwest corner thereof. As suggested by the ellipses, there are a number of additional blocks between bus stop 710-3 and 710-4, and between bus stop 710-1 and 710-2.

Figure 8:
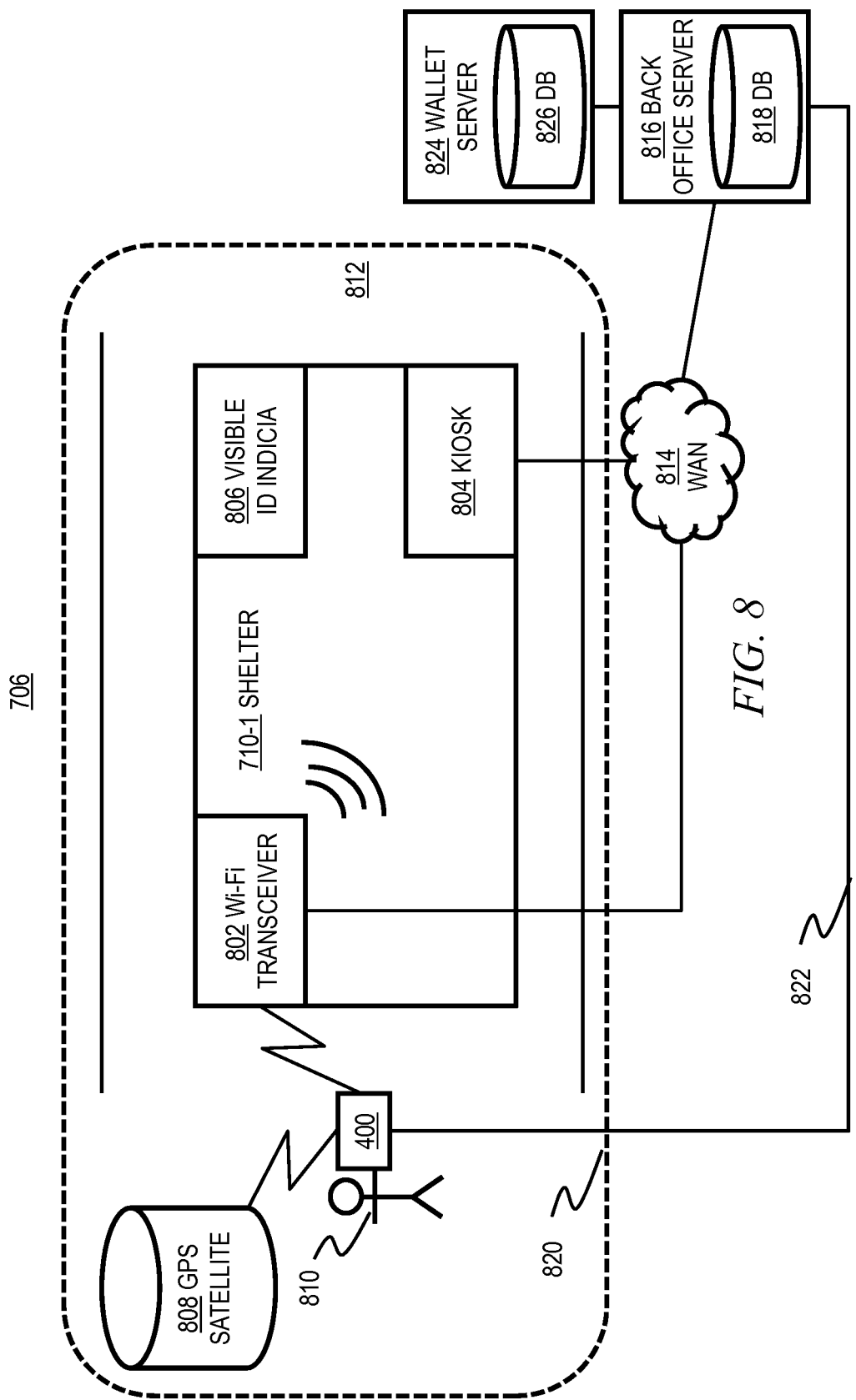
FIG. 8 is a system diagram, in accordance with an aspect of the invention.

FIG. 8 shows additional aspects of one of the bus stops 710-1, which are illustrative of features present at any of the bus stops of interest. Bus stop 710-1 is equipped with a shelter and is located on sidewalk 812 of block 708-5 on the south side of road 706. The size of the sidewalk is exaggerated as compared to the road for purposes of illustrative convenience. Bus stop 710-1 includes conventional kiosk 804 as described above. The kiosk typically has a similar function in all BRT implementations. In one or more embodiments, the kiosk is provided for passengers using conventional access and ticketing methods, i.e., for passengers who are not employing one or more embodiments of the invention. Also included in some instances is Wi-Fi transceiver 802. Transceiver 802 and kiosk 804 are coupled to a back-office server 816 via wide area network (WAN) 814. WAN 814 can be wired or wireless. In some cases, transceiver 802 and kiosk 804 might be coupled to each other by a local area network (LAN) or dedicated cable with only a single connection to WAN 814, instead of each being directly connected to WAN 814 as shown. Transceiver 802 might not be in shelter 710 but might be nearby, as long as in range. Server 816 includes database 818. Server 816 can be located at location 2004 in FIG. 2, and coupled to an issuer 2010 of the passenger 810's payment device account via an acquirer 2006 and payment network 2008.

Passenger 810 uses his or her smart phone or tablet 400 to obtain a ticket to ride an express bus on road 706; here, an eastbound express bus. In some embodiments, phone 400 includes GPS unit 419 in communication with GPS satellites 808; only a single satellite is shown for illustrative convenience, it being understood that the GPS unit is normally in communication with multiple satellites to obtain the position. In some instances, GPS functionality is assisted via triangulation on cellular telephone towers. In one or more embodiments, passenger 810 is only permitted to purchase a bus ticket if he or she is found to be within region 820 (shown as a dotted oblong for illustrative convenience but could be a circle of predetermined radius, for example). The geographical location of user 810 is used by server 816 to look in database 818 and determine which bus stop 710 the user is at and what the corresponding fare should be. In this regard, one or more embodiments are useful in any situation where a unique geographical location corresponds to a particular transaction; riding a bus in a given direction on a given route for a given fare, based on the bus stop location, is one non-limiting example.

In lieu of GPS functionality, user 810 may be determined to be in proximity to bus stop 710-1 by virtue of his or her phone 400 coming into communication with Wi-Fi transceiver 802. In another aspect, visible identifying indicia 806 are provided; for example, an identifying number that user 810 can key into his or her phone 400, or a one or two dimensional bar code that he or she can photograph with camera 439; these indicia can then be sent to back office 816.

Some embodiments include a validation feature. For example, suppose a bus driver or transit police officer suspects that an individual did not pay. Some embodiments help to ensure that a ticket on a mobile device such as 400 is genuine and not a "screen grab." Several options for authentication can be provided in one or more embodiments. At this point, attention should be given to FIGS. 5 and 6. As seen in FIG. 5, smart phone 400 includes a suitable digital wallet application 423 such as the MASTERPASS digital wallet service available from MasterCard International Incorporated, Purchase, N.Y., USA. The application includes information for one or more stored payment cards 502, a user profile 504, stored shipping addresses 506, stored preferences 508, and a selection region for transit application 421, represented by "MTA" icon 510. As seen in FIG. 6, in one or more embodiments, instead of a paper ticket, the user 810 receives an electronic proof of payment 602. Stop ID 604 uniquely identifies the bus stop 710 where the user boards. Optionally, Machine ID 606 uniquely identifies the kiosk. Stop ID 604 is different from machine ID 606 in one or more embodiments in that stop ID 604 is the serial number of bus stop 710 while machine ID 606 is the identity of the machine (e.g., kiosk) at that bus stop. Stop ID may remain constant but machine ID may change due to wear or breakage, for example. Use of Machine ID in addition to Stop ID is an optional feature which also helps to deter fraud. Some embodiments are concerned only with the Stop ID 604 and not the Machine ID 606 (although, as noted, kiosk 804 may nevertheless be provided for passengers employing legacy ticketing and/or access, even when the Machine ID is not employed in connection with one or more embodiments).

The date and time of purchase may be shown, for example, at 608; the route and direction may be shown at 610, 612 respectively; and a unique serial number can be shown at 614. The optional "validate" button 616 is discussed elsewhere herein.

Continuing the discussion of validation, in a first option, a police officer or bus driver takes the serial number 614 at the bottom of the mobile device, as per FIG. 6, and sends an SMS short code back to the data center 816 where the authenticity of the proof of payment 602 can be quickly validated by mirroring what is on the consumer's screen, in a manner analogous to a two-token authentication. The police officer or bus driver sends the serial number 614 from the user's phone 400 to back office 816 using the police officer or bus driver's phone or device; if the number is authentic, the information in the proof of payment 602 will be reproduced at server 816 and sent to the screen of the separate mobile device of the police officer or bus driver, verifying the legitimacy of the ticket.

Some embodiments have a countdown feature; for example, user 810 must use the ticket in two hours (or other predetermined time period) or it expires. Some embodiments include a dynamic countdown on the consumer's screen; after two hours (or other predetermined time period) an "expired" watermark shows up on the screen.

Thus, in one or more embodiments, validation can be accomplished without new hardware, using only items that the transit inspector or police officer will already have. Exemplary methods include, but are not limited to, short code, countdown and validate button as described elsewhere herein.

In one or more embodiments, consumer 810 should be educated to understand that purchases cannot be made anywhere, but rather must be undertaken within a certain radius of the bus stop 710 (e.g., within region 820). In one or more embodiments, the acceptable region delimited by 820 will extend several meters around the perimeter of bus stop 710. Consumer 810 opens up app 421 (optionally by a link within app 423) on mobile phone 400. Phone 400 does two things: (1) polls location through GPS 419 or Wi-Fi 406, and (2) once coordinates are validated, gives user 810 the option to pay for his or her fare. Some embodiments include a hosted data connection to back office 816: once coordinates are identified by mobile device 400, the coordinates are sent back to the host 816 and the host has a table (e.g., in database 818) that correlates coordinates to the particular bus stop. In turn, knowing the particular bus stop yields the required fare. Back office 816 sends a query back to the consumer's phone, asking the consumer whether he or she would like to pay the required fare to get a ticket. For example, "Would you like to pay $6.00 for a ticket on the eastbound Bx41 bus route?" The consumer authenticates and/or validates him or herself to the phone 400 via a PIN or the like (may be entered now or may have been previously entered upon starting transit app on phone). Instead of entering a PIN into the phone, any one or more of the biometric authentication techniques discussed above can be employed. The consumer hits a "check-out" or "buy" button. If answered in the affirmative, back office 816 generates an authorization request (e.g., an ISO 8583 0100 format) for the required amount; this is sent over network 2008 to the issuer of whichever card is being used for payment. Once the issuer approves same, an authorization request response (e.g., ISO 8583 0110) is generated by the issuer and sent to back office 816 over network 2008; if affirmative, an e-ticket is produced with a serial number 614 and all the other required information that indicates that the purchase was made at a specific bus stop along a specific route. The consumer has a visual or GUI on his or her screen, as seen in FIG. 6, that looks like the paper ticket he or she would normally present to the bus operator.

Thus, in one or more embodiments, passenger 810 has smart phone 400 or the like and seeks to ride an express bus. Passenger 810 is inside or very close to bus stop 710-1. Transit app 421 was already turned on, or else is activated by user 810 when he or she desires to ride the bus. The app determines the passenger's location via GPS or local network connection to a transceiver in the bus stop, e.g., Wi-Fi 802, or the rider enters the indicia 806. Transit app 421 automatically communicates GPS coordinates or some other locating information to the back office 816. The back office 816 uses same to look up the bus stop location in database 818, and then, based on the bus stop location, the required fare, also from database 818. A message is sent back to the phone 400, e.g., "Do you want to ride the Bx41 eastbound for a fare of $6?" If the passenger responds in the affirmative, an appropriate message is transmitted from phone 400 to the back office 816, which then carries out a standard authorization request to the issuer of whatever payment card the passenger has associated with his or her account. If there is an approval from the issuer, ticket indicia are sent from the back office to the passenger's mobile phone, formatted in accordance with the local transit agency's requirements. The back office then takes the auth response from the issuer, looks at the conditions under which the auth response was generated, and reconfigures the data so that it can be read by the local transit agency in a consistent manner.

Smart phone 400 can communicate with the back office 816 via a suitable network connection 822. Non-limiting examples of such a connection include broadband via a wireless carrier, Wi-Fi hotspot 802 at bus stop 710, with wired or wireless connection to back office via Internet or private network. There could even be a special transit network wired from the bus stop back in to the back office 816. Thus, network connection 822 could sometimes be made using WAN 814.

Some embodiments use pre-registration, wherein an electronic wallet, of which the aforementioned MASTERPASS is a non-limiting example, has already captured the consumer's card details. In such cases, a server 824 associated with the wallet is employed to provide the credentials (e.g., from database 826) to the hosted service 816 so that host 816 can generate the authorization request. Servers 816, 824 can be connected by the Internet, for example.

Referring again to FIG. 6, in some instances, in addition to, or in lieu of, serial number 614, a one or two-dimensional bar code 618 can be displayed; e.g., a QR code. A transit police officer or bus operator can read this bar code if a bar code reader is available, or else interpret it via a photograph taken with a smart phone or the like, and suitable software. When the bar code or information decoded from it is sent to the back office, the bar code takes the place of the serial number in the validation process. In another variation, the bar code may include all the information 602-614 shown in FIG. 6, and the textual display of such information can optionally be omitted.

Consider now optional "validate" button 616. Suppose the consumer's mobile device 400 displays the ticket as seen in FIG. 6, but the police officer or transit inspector does not trust it. The police officer or transit inspector activates button 616 which causes a one or two dimensional bar code to be generated and displayed (i.e., in this embodiment code 618 is displayed only when button 616 is activated); the police office or inspector uses his or her own phone to take a snapshot of the bar code and to send that information (i.e., image of bar code or information extracted from photo of bar code by software on police officer's or inspector's phone) back to the same host 816 that the consumer's mobile phone was validated on. At that point, the officer or inspector gets a response from that host with the same information as in FIG. 6 so he or she can verify via a visual comparison of his or her own device to the screen of the passenger's phone. As with bar code 618, in some cases, serial number 614 may only be displayed upon button 616 being activated. Button 616 thus provides a way to allow the officer or inspector to quickly access the back end 816 and verify that what he or she sees on the passenger's phone is the result of legitimate interaction with the back end and proper payment, and not a fraudulent screen shot or the like.

One or more embodiments provide transit solutions for BRT. The customer's smartphone can download the MASTERPASS or similar wallet application to pay for the customer's BRT fare. The customer loads his or her payment card information onto the wallet application. The customer pays for his or her fare at the specific BRT bus stop (e.g., 710-1). Once the fare is purchased, an e-ticket is created on the mobile device, as seen in FIG. 6, which can be validated by an inspector or bus operator. In one or more embodiments, the e-ticket displays the same information as a prior art paper ticket, as well as additional information such as bar code 618. In some cases, the e-ticket can be used for bus transfers. In some embodiments, ride and purchase history are available on mobile phone 400. In some cases, customers can track the next bus that is scheduled to show up at the stop, using app 421.

Some embodiments emulate a "coin" transaction and do not require the use of a dedicated transit fare card. As noted, one or more embodiments encode the bus stop location 604 and time stamp 608 upon initial fare purchase and display same on the e-ticket to validate the transaction and determine if transfers are to be granted. Some embodiments coordinate with the acquirer of the bus line to coordinate authorizations and settlements. Some embodiments use an electronic wallet application, a non-limiting example of which is MASTERPASS, on smart phones such as Android and iPhone smart phones (marks of Google Inc., Mountain View, Calif., USA and Apple Inc., Cupertino, Calif., USA). Some embodiments make use of application program interfaces (APIs) to integrate with payments and/or bus route information. Some instances streamline back-office account management (authorizations and/or settlement) without full integration with automated fare collections (AFC). In some cases, bus line inspectors and bus operators are educated regarding how to inspect the e-ticket for proof of purchase.

In current systems, customers pay their fares prior to boarding the bus, at machines at BRT stops. Currently, one can pay by a dedicated transit fare card such as the New York MetroCard, or via coin (but not via payment cards such as credit or debit cards). Currently, one can only pay for a flat fare rate (no time based fares). Customers are issued a paper proof-of-payment receipt, or ticket, which they must hold during their trips to show to an inspector who may be riding the bus or at a bus stop. Current BRT schemes support transfers in two ways: (1) Dipping the dedicated transit fare card into the BRT vending machine to encode the information on the card—the rider will dip his or her dedicated transit fare card into the fare box on the connecting bus and the transfer will be accepted; or (2) customers who pay with coins show the receipt to the bus driver at the front of the bus; the bus driver will then let such customers on the bus.

In contrast, in one or more embodiments, in an enrollment process, in the US, the rider will download the wallet application 423 (e.g., MASTERPASS wallet) and will then download the merchant QkR application—which will allow the rider to pay for the specific transit fare within proximity of BRT service. QkR is a smart phone payment application available from MasterCard International Incorporated, Purchase, N.Y., USA. QkR is a non-limiting example of a suitable smart phone or similar application. The consumer will then enroll his or her payment card details (PAN, expiration date, etc.) into the MASTERPASS wallet to use for payments. The QkR application will identify the appropriate transit BRT stop 'Transit Hotspot' (e.g., icon 510) from the GPS, WiFi or serial number or bar code on the physical bus stop and will prompt the consumer to pay for the transaction.

The QkR application will generate an authorization request based on the specific BRT bus stop location. In a non-limiting example, as seen in FIG. 6, appropriate information, including the time stamp of the transaction and point of origin, is displayed on the mobile device for inspection. In one or more embodiments, to perform transfers, similar to the paper ticket, the bus operator reviews the point of origin and time to confirm if a transfer is granted.

By way of review, in some instances, using a data service, proximity to a bus stop or other point of entry is communicated to an entity (e.g., financial institution) which uses data regarding such proximity to access a look-up table correlating the geographic location to the bus stop, route, and direction, and then generates an authorization message corresponding to same. A QR code or other bar code is used in some instances to identify the bus stop where geographic proximity cannot be obtained; for example, the user photographs the QR code or other bar code with his or her smart phone. As noted, a characteristic serial number of the bus stop can be entered in other instances. The QR code or other bar code, or the serial number, can be employed in lieu of table look-up based on geographic location, again allowing correlation to the bus stop, route, and direction. A QR code can also optionally be used for validation as discussed elsewhere herein; it is displayed on the transit rider's phone and scanned by the police officer or transit inspector.

Furthermore, in one or more embodiments, the QkR application provides a consumer interface between the consumer and the merchant; once the location is validated, the consumer (e.g., commuter or other transit rider) is afforded an opportunity to purchase the appropriate ticket (corresponding to route, location, and direction). In some cases, past riding history of the consumer is used to augment the current geographical location to decide what ticket option to offer to the consumer (purely by way of a non-limiting example, past history might provide insight into whether the user needs a full fare, senior fare, family rate, etc.). In one or more embodiments, the QkR (or similar) application is a consumer retail application present on the consumer's handheld device; the retailer has accepted the terms and conditions of the QkR program and will allow for goods and/or services to be provided to the consumer, as long as the required authorization has been performed on his or her mobile device. Currently, if the consumer is in a specific area where a QkR retailer exists, the app will pop up on the screen of the user's mobile device and he or she can select the information and decide whether to pay for the goods or services. In one or more embodiments, on the other hand, the consumer does not need to select anything; presence at a given bus stop results in automatic population of the corresponding information onto the consumer's handheld device.

It is worth noting that the skilled artisan will be familiar with the QkR smart phone payment application per se as currently available from MasterCard International Incorporated, Purchase, N.Y., USA, as well as other suitable smart phone or similar applications, which can be modified, given the teachings herein, to implement one or more embodiments. Nevertheless, out of an abundance of caution, the following three documents are expressly incorporated herein by reference in their entireties for all purposes:

1. US Patent Application Publication 2012-0131094
2. US Patent Application Publication 2012-0130889
3. Gary Lyons et al., unpublished U.S. patent application Ser. No. 13/739,465 filed Jan. 11, 2013, FINANCIAL CARD METHOD, DEVICE AND SYSTEM UTILIZING BAR CODES TO IDENTIFY TRANSACTION DETAILS In one or more embodiments, each BRT bus stop is associated with a specific GPS coordinate—the phone 400 can interpret these coordinates as the appropriate stop (or more typically can send the GPS coordinates to the back end server 816 for lookup in database 818). Date and time are populated by the hosted server 816, and in one or more embodiments, mimic the same date and time as on servers of the bus line. Similar to the bus stop, each bus route and station are separate from all other BRT routes and stations—one or more embodiments use the phone's GPS coordinates to determine at which station the customer is located and to apply the appropriate bus route and direction. Each serial number is generated by the hosted service 816 and is sent to automated fare collection (AFC) for validation.

As noted, various options can be employed for e-ticket validation. In an "SMS" approach, an operator or inspector may send the serial number to a text message short code. The operator or inspector will receive a response with the date and time of the transaction. In an interactive voice response (IVR) approach, the operator or inspector calls an automated call center and enters serial number 614. The IVR interface is connected to the e-wallet and validates the date and time of the transaction.

As noted, in one or more embodiments, the rider will need to be at a specific BRT bus stop before he or she can pay for his or her fare. The BRT bus stop coordinates are tied to the proper Bus Route and Reader ID and are displayed on the e-ticket. If there is a GPS error, in one or more embodiments, the rider is able to manually input a serial number or other indicia 806 posted on the BRT bus stop, or the customer is located by proximity to Wi-Fi transceiver 802. This ensures all riders may still be able to pay for their fare without interacting with the SBS readers. By way of further explanation, in at least some embodiments, physical interaction with BRT readers is not required. A serial number or QR code or the like are provided as technical fallbacks to GPS failures.

In another aspect, the e-wallet may be offered by the operator of a payment network 2008, who can provide additional merchant discounts to riders who use their e-wallet for BRT payment.

Some embodiments have multiple payment options: monthly pass, one-time transaction, or wallet 423 integrated with phone 400 (e.g., MASTERPASS digital wallet service available from MasterCard International Incorporated, Purchase, N.Y., USA; ISIS mobile wallet available from JVL Ventures, LLC, New York, N.Y., USA; or the Google Wallet available from Google Inc., Mountain View, Calif., USA). Regarding a one-time transaction, a user may be approaching a bus stop for the first time, not have a pass, and desire to ride the bus.

Some embodiments are applicable in other contexts besides BRT; for example, trains and/or subways.

Recapitulation

Given the discussion thus far, it will be appreciated that, in general terms, an exemplary method, according to an aspect of the invention, includes the step of obtaining, at a remote server 816, an indication that a prospective transit rider has come into geographic proximity of a particular transit boarding area such as 710-1. For example, detect proximity to express bus stop or other location via GPS, Wi-Fi, serial number entry or bar code photograph and/or scanning, as described elsewhere herein. A further step includes, at the remote server, dispatching an authorization request to an issuer of a payment card account associated with the prospective transit rider, based on the remote server accessing a database 818 based on the indication. For example, calculate fare parameters based on the indication of location by using the geographic location or other data to enter database 818 to identify the stop, route, direction of travel, and corresponding fare. Even further steps include obtaining, at the remote server, a response to the authorization request, from the issuer; and, if the response is affirmative, initiating dispatch of an electronic ticket to a portable electronic device 400 of the prospective transit rider. For example, send from server 816 to phone 400 a query to confirm route, direction, amount of ticket; if confirmed by prospective rider 810, then send e-ticket from server 816 or other remote location to phone 810.

Optional steps include obtaining at server 816 a validation query from a transit inspector, police officer, or the like (generally, "official"), and responding to same (e.g., to a device of the inspector or police officer) with a duplicate ticket or the like, if the original ticket is valid, as described elsewhere herein.

In another aspect, another exemplary method includes the step of dispatching, from a portable electronic device 400 of a prospective transit rider 810, to a remote server 816, an indication that the prospective transit rider has come into geographic proximity of a particular transit boarding area such as 710-1. For example, detect proximity to express bus stop or other location via GPS, Wi-Fi, serial number entry or bar code photograph and/or scanning, as described elsewhere herein. A further step includes obtaining, from the remote server, a confirmation query seeking to confirm whether the prospective transit rider seeks to board a certain transit mode (bus, train, etc.), at a certain fare. The confirmation query is determined (e.g., by server 816) based on the indication. Further steps include dispatching, from the portable electronic device of the prospective transit rider, to the remote server, an affirmative response to the confirmation query; and obtaining, from the remote server, an electronic ticket.

Optional steps include responding with device 400 to a validation query from a transit inspector, police officer, or the like, with a serial number or bar code or the like, if the original ticket is valid, as described elsewhere herein. The officer or inspector can forward same to server 816 with his or her device for validation, as described elsewhere herein.

The skilled artisan will appreciate, based on the description herein, that in some embodiments, in a transfer scenario, a particular transit boarding area will be a first rapid transit bus stop for a first associated rapid transit bus route. At least a portion of the electronic ticket is displayed on a display device of the portable electronic device of the prospective transit rider, to a crew member of a bus on a second rapid transit bus route, to authorize transfer of the prospective transit rider from the first associated rapid transit bus route to the second rapid transit bus route.

In another aspect, a transit back office server apparatus, such as described as element 816 herein, includes a memory, at least one processor operatively coupled to the memory, and a persistent storage device operatively coupled to said memory and storing in a non-transitory manner instructions which when loaded into the memory cause the at least one processor to be operative to carry out or otherwise facilitate any one, some, or all of the corresponding method steps described herein. Refer generally to the discussion of FIG. 3.

In another aspect, a portable electronic device, such as described as element 400 herein, includes a memory, at least one processor operatively coupled to the memory, and a persistent storage device operatively coupled to said memory and storing in a non-transitory manner instructions which when loaded into the memory cause the at least one processor to be operative to carry out or otherwise facilitate any one, some, or all of the corresponding method steps described herein. Refer generally to the discussion of FIG. 4.

It is worth noting that the skilled artisan will be familiar with payment card networks per se, such as the MASTERCARD BANKNET network. Thus, the skilled artisan will appreciate that back office server 816 or wallet server 824 could interface with a payment card network such as 2008 by using, for example, a front end communications processor such as a MASTERCARD INTERFACE PROCESSOR™ or MIP™ processor (trademarks of MasterCard International, Inc. of Purchase, N.Y.). A MIP is a front-end communications processor that is placed on-site at a MasterCard customer's facility by MasterCard for the purpose of providing access to the BANKNET telecommunication network. When the interface with a payment card network is implemented as MIP, for example, it may be on a separate hardware processor from server 816 or server 824 and may communicate therewith via a suitable network. Appropriate software modules may run on the MIP.

System and Article of Manufacture Details

Embodiments of the invention can employ hardware and/or hardware and software aspects. Software includes but is not limited to firmware, resident software, microcode, etc. Software might be employed, for example, in connection with one or more of a smart phone, tablet, or other portable device 400, 1420, a terminal 122, 124, 125, 126, a reader 132, payment devices such as cards 102, 112, 400, 1302, 1420, a host, server, and/or processing center 140, 142, 144 (optionally with data warehouse 154), 816, 824 of a merchant, issuer, acquirer, processor, express bus system operator or operator of a similar limited enterprise or public service, operator of a network 2008 operating according to a payment system standard (and/or specification), and the like. Firmware might be employed, for example, in connection with payment devices such as cards 102, 112, 1302, 1420 and reader 132. Firmware provides a number of basic functions (e.g., display, print, accept keystrokes) that in themselves do not provide the final end-use application, but rather are building blocks; software links the building blocks together to deliver a usable solution.

Figure 3:
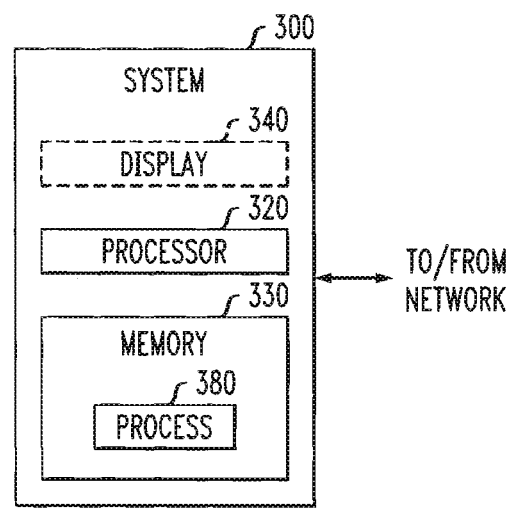
FIG. 3 is a block diagram of an exemplary computer system useful in one or more embodiments of the invention.

FIG. 3 is a block diagram of a system 300 that can implement part or all of one or more aspects or processes of the invention. As shown in FIG. 3, memory 330 configures the processor 320 (which could correspond, e.g., to processor portions 106, 116, 130; a processor of a reader 132; processors of remote hosts in centers 140, 142, 144; processors of hosts and/or servers 816, 814 implementing various functionality, a processor of a desktop computer, processor 402, and the like) to implement one or more aspects of the methods, steps, and functions disclosed herein (collectively, shown as process 380 in FIG. 3). Different method steps can be performed by different processors. The memory 330 could be distributed or local and the processor 320 could be distributed or singular. The memory 330 could be implemented as an electrical, magnetic or optical memory, or any combination of these or other types of storage devices (including memory portions as described above with respect to cards 102, 112). It should be noted that if distributed processors are employed, each distributed processor that makes up processor 320 generally contains its own addressable memory space. It should also be noted that some or all of computer system 300 can be incorporated into an application-specific or general-use integrated circuit. For example, one or more method steps could be implemented in hardware in an ASIC rather than using firmware. Display 340 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined to exclude a transmission medium per se or disembodied signal per se.

The computer systems and servers described herein each contain a memory that will configure associated processors to implement the methods, steps, and functions disclosed herein. Such methods, steps, and functions can be carried out, by way of example and not limitation, by processing capability in processors 402, 320, or by any combination of the foregoing or other processors described herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 300, 400, 816, 824 can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance. Unit 300 is representative of a server and also of a laptop, tablet, or desktop computer of a user.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 300 as shown in FIG. 3) running a server program. It will be understood that such a physical server may or may not include a display, keyboard, or other input/output components. A "host" includes a physical data processing system (for example, system 300 as shown in FIG. 3) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the elements shown in the figures. In one or more embodiments, a transit app 421, wallet app 423, QkR or similar app, and the like, reside on smart phone 400 or similar device; a back office database and back office platform reside on a back office server 816; a wallet database and a wallet platform reside on a wallet server 824. The method steps can then be carried out using the distinct software modules of the system, as described above, executing on one or more hardware processors of the phone 400, server 816, server 824, and so on. Further, a computer program product can include a tangible computer-readable recordable storage medium with code adapted to be executed to carry out one or more method steps described herein, including the provision of the system with the distinct software modules.

Computers, tablets, smart phones, and/or other elements with processing capability as discussed herein can be interconnected, for example, by one or more of network 138, 2008, another virtual private network (VPN), the Internet, a local area and/or wide area network (LAN and/or WAN), via an EDI layer, via a Wi-Fi network of which transceiver 802 is a part, via Bluetooth, via NFC, and so on. The computers can be programmed, for example, in compiled, interpreted, object-oriented, assembly, and/or machine languages, for example, one or more of C, C++, Java, Visual Basic, COBOL, and the like (an exemplary and non-limiting list), and can also make use of, for example, Extensible Markup Language (XML), known application programs such as relational database applications, spreadsheets, and the like. The computers can be programmed to implement the logic depicted described and shown herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
obtaining, at a remote server, an indication that a prospective transit rider has come into geographic proximity of a particular transit boarding area;
at the remote server, dispatching an authorization request to an issuer of a payment card account associated with said prospective transit rider, based on said remote server accessing a database based on said indication;
obtaining, at said remote server, a response to said authorization request, from said issuer;
if said response is affirmative, initiating dispatch of an electronic ticket to a portable electronic device of said prospective transit rider;
wherein said remote server is coupled to said portable electronic device of said prospective transit rider via a first telecommunication network comprising a transit network;
wherein said remote server is coupled to said issuer of said payment card account via a second telecommunication network comprising a payment card network; and
wherein said authorization request and said electronic ticket are dispatched only if said prospective transit rider is within said geographic proximity of said particular transmit boarding area;
said dispatched electronic ticket being displayed by said portable electronic device of said prospective transit rider, the method further comprising:
obtaining, at said remote server, from a portable electronic device of an official, a validation query comprising a bar code generated by said portable electronic device of said prospective transit rider and distinct from said displayed electronic ticket, said portable electronic device of said official being separate from said portable electronic device of said prospective transit rider; and
responsive to said validation query, dispatching, from said remote server, to said portable electronic device of said official, a response to assist said official in assessing validity of said electronic ticket.

2. The method of claim 1, wherein, in said step of obtaining said indication, said indication is based on global positioning system-determined location of said portable electronic device of said prospective transit rider.

3. The method of claim 1, wherein:
said particular transit boarding area comprises a rapid transit bus stop;
said remote server accessing said database based on said indication comprises said remote server querying said database based on said indication to identify said rapid transit bus stop, an associated rapid transit bus route, an associated direction of travel, and a corresponding fare; and
in said step of dispatching said authorization request, said authorization request includes an amount of said corresponding fare.

4. The method of claim 3, further comprising:
dispatching, from said remote server, to said portable electronic device of said prospective transit rider, a confirmatory query asking said prospective transit rider to confirm accuracy of said associated rapid transit bus route, said associated direction of travel, and said corresponding fare; and
obtaining, at said remote server, an affirmative response to said confirmatory query;
wherein said dispatch of said electronic ticket to said portable electronic device of said prospective transit rider is further responsive to said affirmative response to said confirmatory query.

5. The method of claim 1, wherein:
said obtaining of said indication is carried out with a back office platform module, embodied on a non-transitory computer-readable storage medium, executing on at least one hardware processor of said remote server;
said dispatching of said authorization request is carried out with said back office platform module, executing on said at least one hardware processor of said remote server, based on a query of said database with a back office database module embodied on said non-transitory computer-readable storage medium, executing on said at least one hardware processor of said remote server;
said obtaining of said response to said authorization request is carried out with said back office platform module, executing on said at least one hardware processor of said remote server; and
said initiating of said dispatch of said electronic ticket is carried out with said back office platform module, executing on said at least one hardware processor of said remote server.

6. A transit back office server apparatus comprising:
a memory;
at least one processor operatively coupled to said memory; and
a persistent storage device operatively coupled to said memory and storing in a non-transitory manner instructions which when loaded into said memory cause said at least one processor to be operative to:
obtain an indication that a prospective transit rider has come into geographic proximity of a particular transit boarding area;
dispatch an authorization request to an issuer of a payment card account associated with said prospective transit rider, based on said back office server apparatus accessing a database based on said indication;
obtain a response to said authorization request, from said issuer; and
if said response is affirmative, initiate dispatch of an electronic ticket to a portable electronic device of said prospective transit rider;
wherein said transit back office server apparatus is coupled to said portable electronic device of said prospective transit rider via a first telecommunication network comprising a transit network;
wherein said transit back office server apparatus is coupled to said issuer of said payment card account via a second telecommunication network comprising a payment card network; and wherein said authorization request and said electronic ticket are dispatched only if said prospective transit rider is within said geographic proximity of the particular transmit boarding area;

said dispatched electronic ticket being displayed by said portable electronic device of said prospective transit rider, said at least one processor being further operative to:

obtain, from a portable electronic device of an official, a validation query comprising a bar code generated by said portable electronic device of said prospective transit rider and distinct from said displayed electronic ticket, said portable electronic device of said official being separate from said portable electronic device of said prospective transit rider; and responsive to said validation query, dispatch, to said portable electronic device of said official, a response to assist said official in assessing validity of said electronic ticket.

7. The transit back office server apparatus of claim 6, wherein:

said particular transit boarding area comprises a rapid transit bus stop;

said persistent storage device operatively coupled to said memory further stores in a non-transitory manner instructions which when loaded into said memory cause said at least one processor to be further operative to access said database based on said indication by querying said database based on said indication to identify said rapid transit bus stop, an associated rapid transit bus route, an associated direction of travel, and a corresponding fare; and said authorization request includes an amount of said corresponding fare.

* * * * *